United States Patent
Chhetri

(10) Patent No.: US 9,473,646 B1
(45) Date of Patent: Oct. 18, 2016

(54) ROBUST ACOUSTIC ECHO CANCELLATION

(71) Applicant: Amazon Technologies, Inc., Reno, NV (US)

(72) Inventor: Amit Singh Chhetri, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 499 days.

(21) Appl. No.: 14/028,229

(22) Filed: Sep. 16, 2013

(51) Int. Cl.
*H04M 9/08* (2006.01)

(52) U.S. Cl.
CPC ................................ *H04M 9/082* (2013.01)

(58) Field of Classification Search
None
See application file for complete search history.

(56) References Cited

U.S. PATENT DOCUMENTS

| | | | | |
|---|---|---|---|---|
| 6,574,337 B1* | 6/2003 | Kawada | ............... | H04M 9/082 370/289 |
| 6,792,106 B1* | 9/2004 | Liu | ............... | H04B 3/234 370/286 |
| 7,072,465 B1* | 7/2006 | Benesty | ............... | H04B 3/234 370/286 |
| 2009/0022074 A1* | 1/2009 | Brox | ............... | H04M 9/085 370/286 |

* cited by examiner

*Primary Examiner* — Duc C Ho
(74) *Attorney, Agent, or Firm* — Knobbe Martens Olson & Bear, LLP

(57) ABSTRACT

An acoustic echo canceller (AEC) system may be configured to reset the coefficients of a transform equation when an estimated echo diverges from actual acoustic echo. Features are disclosed for determining when to reset the coefficients, and for enabling the reset operation to be performed reliably. Additional features are disclosed for detecting other signal conditions besides AEC divergence, for adjusting the rate at which the coefficients are adapted in response to such conditions, and for prioritizing between potentially incompatible adjustments.

20 Claims, 4 Drawing Sheets

ROBUST ACOUSTIC ECHO CANCELLATION

BACKGROUND

A device for bi-directional audio-based communication typically includes both a loudspeaker and a microphone. The loudspeaker is used to play back audio signals received from a remote ("far-end") source, while the microphone is used to capture audio signals from a local ("near-end") source. In the case of a telephone call, for example, the near- and far-end sources may be people engaged in a conversation, and the audio signals may contain speech. An acoustic echo occurs when the far-end signal emitted by the loudspeaker is captured by the microphone, after undergoing reflections in the local environment.

An acoustic echo canceller (AEC) may be used to remove acoustic echo from an audio signal captured by a microphone, in order to facilitate improved communication. The AEC typically filters the microphone signal by determining an estimate of the acoustic echo, and subtracting the estimate from the microphone signal to produce an approximation of the true near-end signal. The estimate is obtained by applying a transformation to the far-end signal emitted from the loudspeaker. The transformation is implemented using an adaptive algorithm such as least mean squares, normalized least mean squares, or their variants, which are known to persons of ordinary skill in the art.

The adaptive transformation relies on a feedback loop, which continuously adjusts a set of coefficients that are used to calculate the estimated echo from the far-end signal. Different environments produce different acoustic echoes from the same loudspeaker signal, and any change in the local environment may change the way that echoes are produced. By using a feedback loop to continuously adjust the coefficients, an AEC can adapt its echo estimates to the local environment in which it operates.

While adaptation generally improves the echo estimates produced by an AEC, this is not always true. The feedback-based adaptation scheme works better in some situations than in others, so it may be beneficial to increase or decrease the rate of adaptation in different situations. An AEC system may therefore include one or more detector modules that monitor relevant signals in order to recognize circumstances in which the rate of adaptation should be adjusted.

One circumstance in which the rate of adaptation may be adjusted is called "double talk." Double talk occurs when the far-end signal and the near-end signal are both simultaneously active. It is contrasted from "transmit single talk" and "receive single talk." In the case of receive single talk, the far-end signal is active (e.g., because a person on the far end is talking), and the near-end signal is inactive (e.g., because nobody on the near end is talking). In this situation, the microphone signal will include only the acoustic echo that is produced by sound reflected from the loudspeaker. The acoustic echo can then be cancelled simply by adjusting the adaptive coefficients until they yield an estimated echo that matches the actual echo present in the microphone signal. Thus, in the case of receive single talk, the feedback loop will cause the estimated echo to rapidly converge on the actual echo.

In contrast, when double talk is present, the microphone signal will include both the near-end signal and the acoustic echo. In this situation, the AEC may be unable to adequately distinguish between the different components of the microphone signal. If the feedback loop continues with the same rate of adaptation during double talk, the estimated echo may diverge from the actual echo, and the AEC may no longer provide satisfactory echo cancellation. In order to prevent such divergence, AECs typically rely on double-talk detectors, which may be used to decrease the rate of adaptation or stop it altogether during periods of double talk.

As previously noted, it may be useful to increase the rate of adaptation in some situations rather than decreasing it. For example, when the communication device changes position relative to objects or people in the local environment, the reflections that produce the acoustic echo may change as well. This is referred to as an echo path change. When an echo path change occurs, the estimated echo produced by the AEC may no longer provide a good approximation of the actual acoustic echo. The AEC's adaptive coefficients will eventually be updated by the feedback loop, but until then the quality of the AEC output will be diminished. Therefore, AECs typically rely on echo path change detectors (EPCDs), which may be used to temporarily increase the rate of adaptation.

As described above, an AEC system may include various detector modules that may trigger increases or decreases in the rate of adaptation. Even if an AEC system has only two detectors, it is possible that adjustments triggered by each detector will conflict with one another. For instance, the adaptation strategy normally triggered by an EPCD (increasing the adaptation rate) is incompatible with the strategy that is normally triggered by a double-talk detector (decreasing the adaptation rate). When additional detector modules are incorporated into an AEC system to deal with other signal conditions, the potential for inconsistent strategies increases, along with the potential for poor performance.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, the present disclosure relates to achieving robust acoustic echo cancellation in a wide range of circumstances. This is accomplished by monitoring various signal conditions using a collection of detector modules. Signal conditions detected by these modules may trigger specific adjustments to the operating parameters of an AEC, including the adaptation rate and the values of adaptive coefficients. In addition, a priority scheme may be defined to resolve potential conflicts between the parameter adjustments triggered by different detector modules. The priority scheme and the adjustments may be implemented by a control module, which may be termed a "full system controller."

Figure 1:
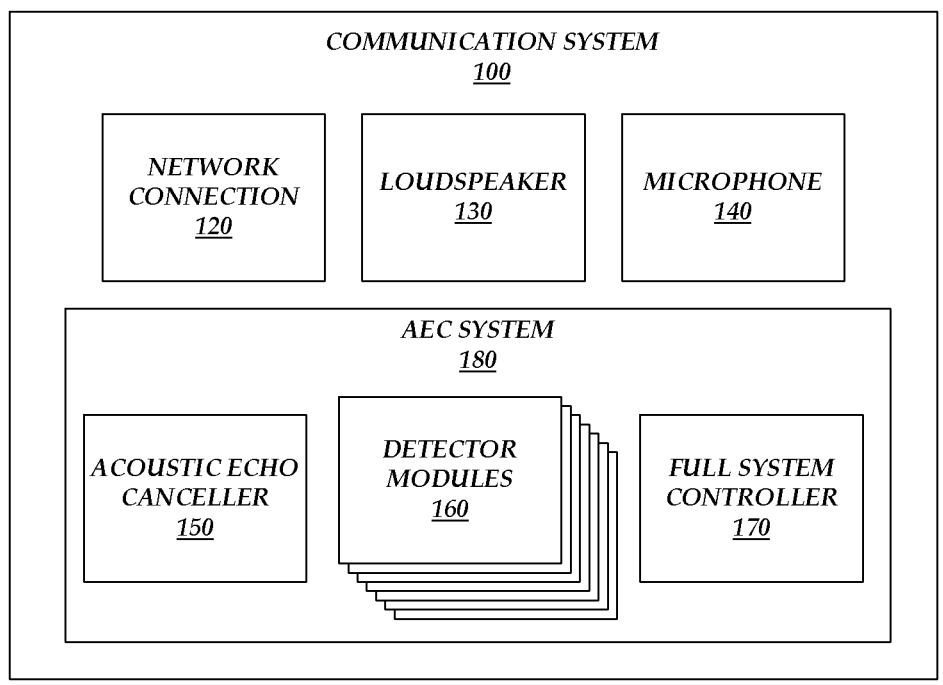
FIG. 1 is a block diagram illustrating components of some communication systems that include acoustic echo cancellers with multiple detector modules.

FIG. 1 shows an example of a communication system 100. Communication system 100 may be implemented in hardware and/or software using techniques known to persons of skill in the art. For example, communication system 100 may be implemented by a single telecommunication device, such as a mobile phone, or by a combination of several devices such as a mobile computing device and a network-accessible server.

FIG. 1 shows components that may appear in communication system 100, including a network connection 120, a loudspeaker 130, a microphone 140, and an AEC system 180. AEC system 180 includes an acoustic echo canceller 150, a plurality of detector modules 160, and a full system controller ("FSC") 170.

Network connection 120 may be used to send and receive communication signals over a network. The network may be any wired network, wireless network, or combination thereof. In addition, the network may be a personal area network, local area network, wide area network, cable network, satellite network, cellular telephone network, or combination thereof. For example, the network may be a publicly accessible network of linked networks, possibly operated by various distinct parties, such as the Internet. In some embodiments, the network may be a private or semi-private network, such as a corporate intranet. The network may include one or more wireless networks, such as a Wi-Fi network, a Global System for Mobile Communications (GSM) network, a Code Division Multiple Access (CDMA) network, a Long Term Evolution (LTE) network, or some other type of wireless network. Secured protocols such as Hypertext Transfer Protocol Secure (HTTPS) may be used to secure communications across the network, e.g., by encryption. Protocols and components for communicating via the Internet or any of the other aforementioned types of networks are well known to those skilled in the art of computer communications and thus, need not be described in more detail herein.

The communication signals that are sent and received by network connection 120 may include a far-end signal, which may be emitted from loudspeaker 130, and an AEC output signal, produced by acoustic echo canceller 150. The AEC output signal may be determined by adaptively filtering a signal from microphone 140. For the sake of simplicity, microphone 140 is referred to herein as a single component. However, in some embodiments, multiple microphones may be used together and an AEC system (or portions of an AEC system) may be provided for each one. Within AEC system 180, FSC 170 may use information from detector modules 160 to control the rate of adaptation and other parameters for acoustic echo canceller 150. Additional aspects of AEC system 180 are described below, with respect to FIGS. 2, 3, 4A, and 4B.

Figure 2:
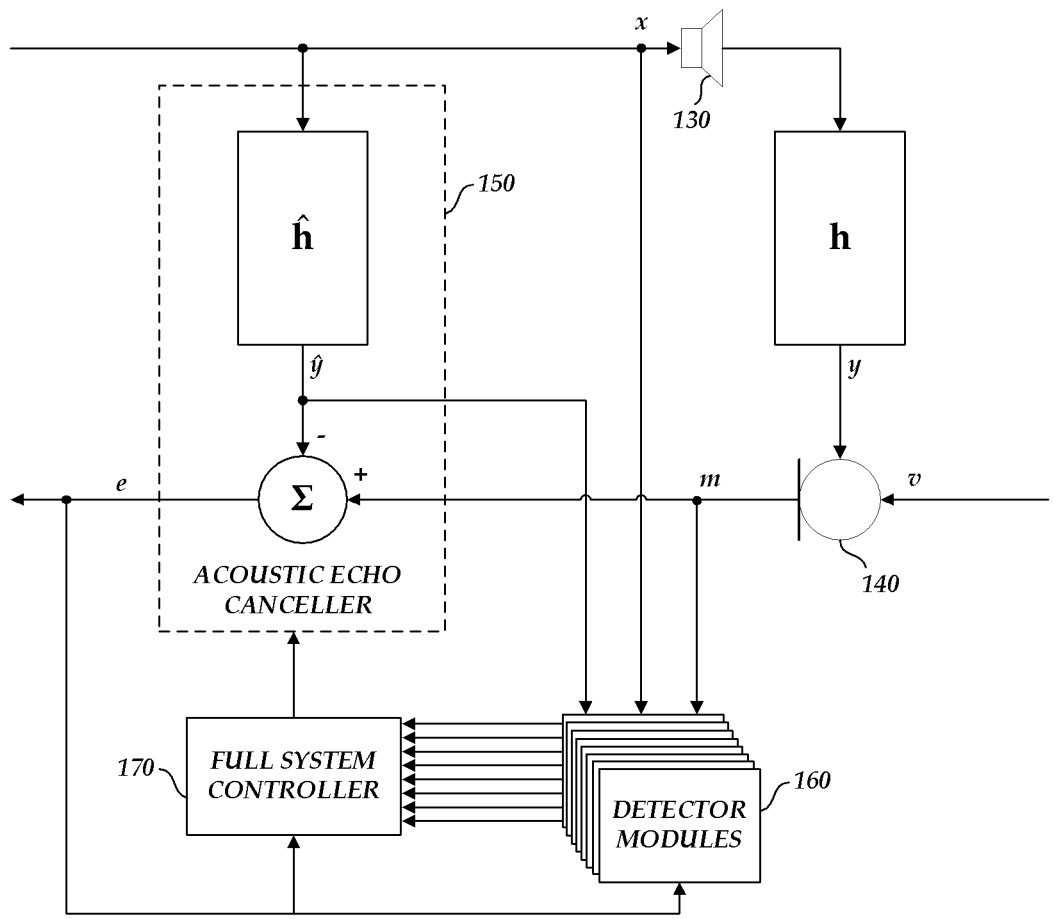
FIG. 2 is a signal diagram depicting the relationships between various signals that are used to perform acoustic echo cancellation.

FIG. 2 is a signal diagram that illustrates the relationships between various signals and components that are relevant to acoustic echo cancellation. Certain components of FIG. 2 correspond to components from FIG. 1, and retain the same numbering. These components include loudspeaker 130, microphone 140, acoustic echo canceller 150, detector modules 160, and FSC 170. The signals depicted in FIG. 2 include far-end signal x, acoustic echo y, near-end signal v, microphone signal m, estimated echo $\hat{y}$, and AEC output e.

FIG. 2 also depicts acoustic transfer function h and estimated acoustic transfer function $\hat{h}$.

In the example of FIG. 2, acoustic echo may occur as follows. Far-end signal x is emitted from loudspeaker 130 and undergoes various reflections in the local environment according to acoustic transfer function h, yielding acoustic echo y. Microphone 140 captures both acoustic echo y and near-end signal v, which together produce microphone signal m. The presence of acoustic echo y in microphone signal m may interfere with the recognition of near-end signal v by a listener, thereby hindering communication. Accordingly, it may be desirable to filter microphone signal m in order to remove acoustic echo y, to the extent that such removal is possible.

AEC 150 may be configured to filter microphone signal m in the following manner. First, AEC 150 applies estimated transfer function $\hat{h}$ to far-end signal x, yielding estimated echo $\hat{y}$. Estimated echo $\hat{y}$ is subtracted from microphone signal m, producing AEC output e. AEC output e is an estimate of the near-end signal v, and if AEC 150 is functioning properly then the content of near-end signal v will be more easily discerned from AEC output e than from microphone signal m.

As described above, AEC 150 relies on estimated echo $\hat{y}$, which in turn relies on estimated transfer function $\hat{h}$. The estimation of transfer function $\hat{h}$ may be adaptive. For example, the coefficients of the transfer function may be adjusted automatically and continuously by a feedback loop. FSC 170 may determine adjustments to the rate of adaptation used in the feedback loop, and may also directly adjust the values of the coefficients used in transfer function $\hat{h}$ under certain circumstances. The adjustments may be determined based on information from detector modules 160 according to the process depicted in FIG. 3.

Detector modules 160 perform various calculations to recognize relevant signal conditions. The inputs to these calculations may include microphone signal m, far-end signal x, estimated echo $\hat{y}$, and AEC output e. Detector modules 160 may be configured to detect, e.g., double talk, echo path change, and AEC divergence, along with anomalies and inactivity in the microphone and loudspeaker signals. The various signal conditions that may be recognized by detector modules 160 are discussed in further detail below with respect to FIG. 3.

The AEC 150, detector modules 160, and FSC 170 process the signals on a frame-by-frame basis. Here, a frame represents a collection of discrete signal samples (in the correct sequence). In some embodiments, the frame is 8-10 milliseconds long. For each frame, the detector modules process the sequence of signal samples within the frame to compute various signal characteristics. In some cases, the computed characteristics may also depend in part on samples from previous frames. Once the end of the frame is reached, the computed characteristics are used to determine the output of each detector module.

Signal samples are indexed by discrete sample index n, with each sample representing the state of the signal at a particular point in time. Thus, for example, the signal e may be represented by a sequence of samples $e(0), e(1), \ldots e(n)$. In this example the index n corresponds to the most recent point in time for which a sample is available. In addition, calculations involving various signals may be expressed using the sample index n. For example, the value of e at time n may be determined by the equation $e(n)=m(n)-\hat{y}(n)$.

In some cases, the value of one signal at time n may depend on values of one or more other signals at several points in time. For example, that the value of estimated echo ŷ depends on the value of the far-end signal x, as follows:

$$\hat{y}(n)=\hat{h}(n)*x(n),$$

where '*' denotes the convolution operation. The value of the estimated transfer function ĥ(n) at time n may be defined to depend on the value of the input signal at several points in time. Using x as the input signal, the value of the convolution of h and x at time n may be calculated this way:

$$\hat{h}(n)*x(n)=\hat{h}_0(n)x(n)+\hat{h}_1(n)x(n-1)+ \ldots +\hat{h}_L(n)x(n-L)$$

Combining the last two equations, it can be seen that the value of ŷ at time n depends on the value of x at times n, n−1, . . . , n−L:

$$\hat{y}(n)=\hat{h}_0(n)x(n)+\hat{h}_1(n)x(n-1)+ \ldots +\hat{h}_L(n)x(n-L)$$

Thus, the value of a particular signal at one point in time may be calculated from values of other signals at multiple points in time.

Note that in the foregoing example, the estimated transfer function ĥ is defined by a set of coefficients $\hat{h}_0, \hat{h}_1, \ldots, \hat{h}_L$. These are the adaptive coefficients of the AEC, which are adjusted continuously in order to make the estimated echo ŷ converge on the actual echo y. The calculation of ŷ depends on values of the far-end signal x at several different points in time because the actual echo y may be caused by reflections of x along multiple paths in the local environment. Some of these paths will be longer than others, and the time required for sound to traverse them will vary accordingly. The acoustic echo y that reaches the microphone at a particular time will therefore correspond to values of x from multiple points in time. The calculation of ŷ is designed to account for this fact, which is why ŷ(n) depends on x(n), x(n−1), . . . x(n−L).

The signals described above are illustrative, and an AEC system may include a variety of additional signals beyond those depicted in FIG. 2 without departing from the inventive concepts described herein. For example, detector modules 160 or FSC 170 may use additional or different input signals apart from those depicted in FIG. 2 in order to perform the detection and control operations described below.

Figure 3:
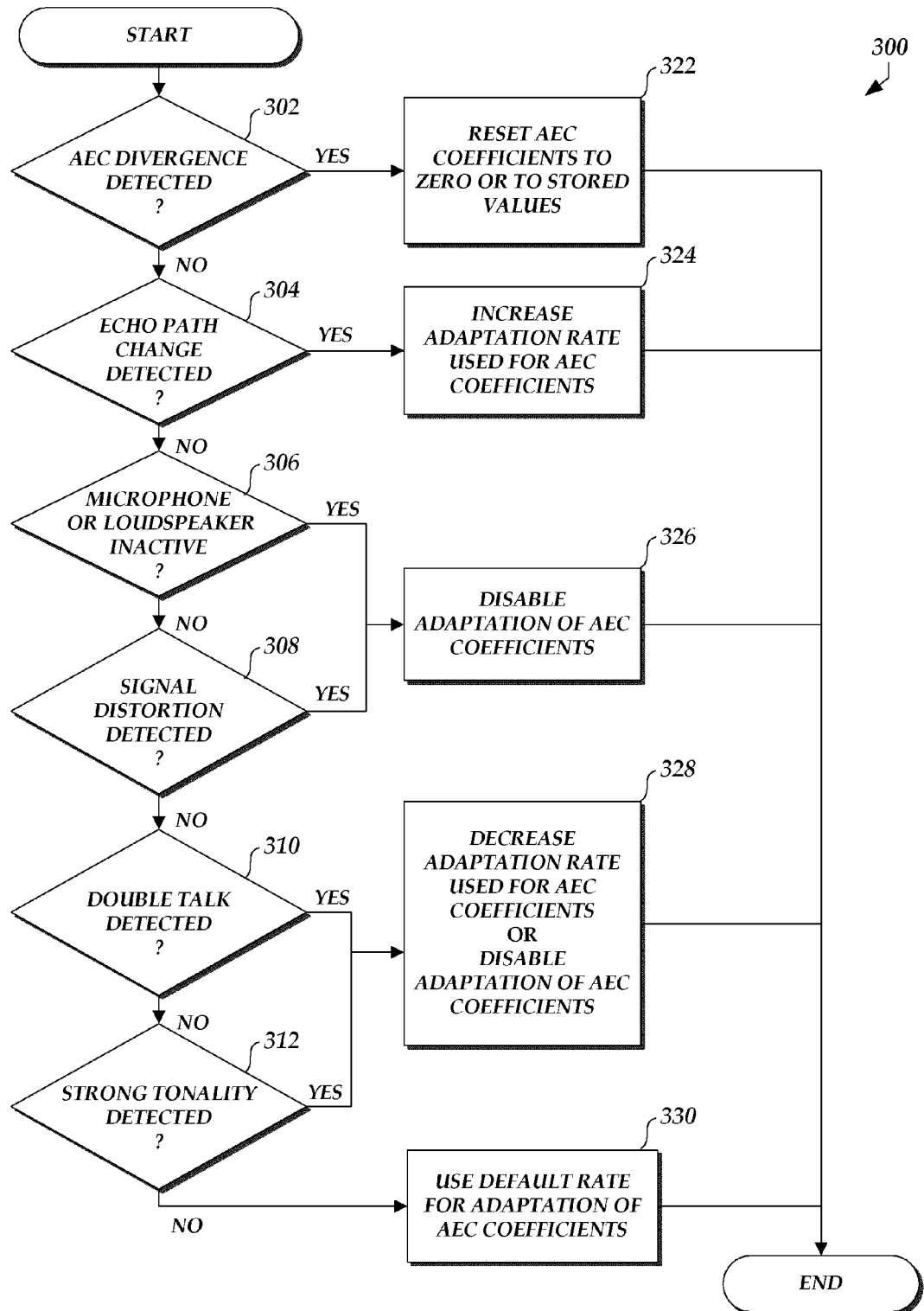
FIG. 3 is a flow diagram of an illustrative process for controlling an acoustic echo canceller based on inputs from multiple detector modules according to aspects of the present disclosure.

Turning now to FIG. 3, an example process 300 for controlling an AEC is depicted. In terms of the components shown in FIGS. 1 and 2, process 300 may be implemented by FSC 170 using information obtained from detector modules 160 to control AEC 150. Advantageously, process 300 includes a priority scheme that dictates the order in which signal conditions are considered when adjusting the operating parameters of the AEC. This priority scheme prevents conflicts between incompatible actions triggered by different detector modules.

Figure 4A:
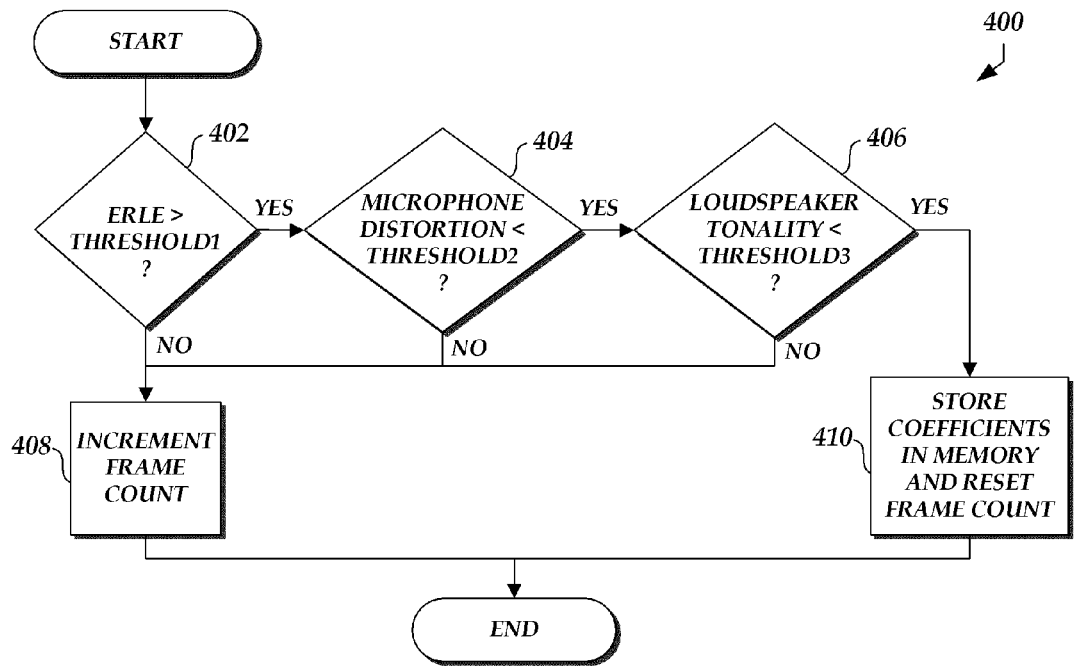
FIG. 4A is a flow diagram of an illustrative process for storing adaptive coefficients from an AEC in memory if the AEC is performing well.
Figure 4B:
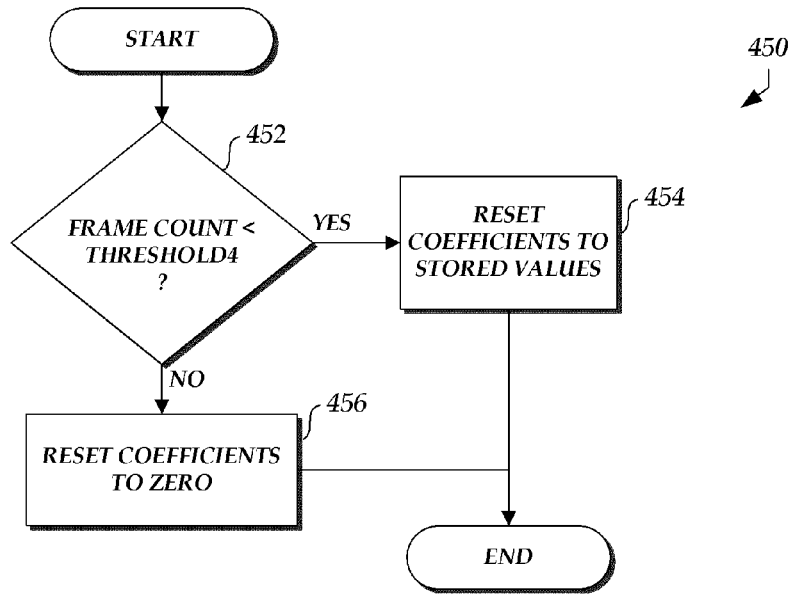
FIG. 4B is a flow diagram of an illustrative process for resetting adaptive coefficients in an AEC when the AEC is performing poorly.

Process 300 begins at block 302, where detector modules 160 determine whether AEC divergence has occurred, that is, whether the estimated acoustic echo ŷ has diverged from the actual echo y. Although many signal conditions in an AEC may be handled by adjusting the rate of adaptation, a different strategy is appropriate in the case of AEC divergence. When divergence occurs, continued adaptation may not improve the echo estimate. Therefore, if divergence is detected, process 300 proceeds to block 322 where the coefficients of the transfer function ĥ are reset. Each of the coefficients may be set to zero or to a value previously stored in memory. An example process for storing coefficients in memory is depicted in FIG. 4A, and an example process for determining the proper coefficient values to use during a reset operation is depicted in FIG. 4B.

If AEC divergence is not detected, process 300 continues to block 304 where detector modules 160 determine whether echo path change has occurred. If an echo path change is detected, process 300 continues to block 324, where the adaptation rate of the AEC is increased. This increased adaptation rate allows the AEC to react more rapidly to changes in the way that echoes are reflected in the local environment. More specifically, the increased adaptation rate may cause the estimated transfer function ĥ and the estimated echo ŷ to converge more rapidly on the actual transfer function h and the actual echo y.

If echo path change is not detected, process 300 continues to block 306 where detector modules 160 determine whether the microphone signal m and the far-end signal x are active or inactive. If either signal is inactive, process 300 continues to block 326 where AEC adaptation is disabled. Disabling adaptation is appropriate in these circumstances because there will be no acoustic echo to compare the estimated echo to when the microphone is not capturing sound or when the loudspeaker is not emitting sound. In some embodiments, the relevant signals will be deemed inactive when the loudness of the signal falls below a certain threshold.

If both the microphone signal m and the far-end signal x are active, process 300 continues to block 308, where detector modules 160 determine whether distortion is present in either signal. Clipping is one example of such distortion. It occurs when the amplitude of the microphone signal exceeds the maximum value that can be accommodated within the dynamic range of a sample. Samples that would otherwise exceed the maximum value are clipped, or artificially limited to that maximum. If detector modules 160 recognize clipping, or other types of distortion, then process 300 continues to block 326. At block 326, adaptation is disabled as mentioned above. Disabling adaptation when distortion is present prevents corruption of the AEC coefficients by unreliable input data.

If distortion is not detected at block 308, process 300 continues to block 310. At this block, detector modules 160 ascertain the presence or absence of double talk. As noted previously, adaptation during double talk may result in AEC divergence. Accordingly, if double talk is detected then process 300 continues to block 328, where the adaptation rate may be decreased or adaptation may be disabled altogether. These measures limit the impact of double talk on the AEC coefficients and help prevent divergence.

If double talk is not detected, process 300 continues to block 312, where detector modules 160 determine whether the far-end signal x exhibits strong tonality. In other words, the detector modules determine whether any frequency has been disproportionately excited in the far-end signal. If so, process 300 continues to block 328 where, again, adaptation may be slowed or disabled. If none of the signal conditions described above are recognized by detector modules 160, then process 300 continues to block 330 and a default rate is used for adaptation of the AEC coefficients. This default adaptation rate may be the rate that the AEC uses for adaptation during receive single talk.

As previously discussed, AEC coefficients may be reset when divergence is detected. In order for the coefficients to be reset to a value other than zero, coefficients from a previous frame must be available in memory. But even when coefficients are available in memory, they may not be used if they are too old, e.g., if too many frames have been processed since they were stored. Older coefficients may go unused because they are less likely to provide an adequate approximation of the echo produced by the local environment in its current state. In accordance with the foregoing considerations, FIG. 4A depicts an example process 400 for storing coefficients in memory when an AEC is performing well, and FIG. 4B depicts an example process 450 for determining, during a reset operation, whether stored coefficients are sufficiently recent to be relied upon.

Process 400 begins at block 402, where a statistic referred to as echo return loss enhancement (ERLE) is determined and compared to a first threshold. ERLE is a statistic that is known to persons of skill in the art, and it is generally used to measure how much echo cancellation has occurred during receive single talk. In the present context, it is used to ensure that coefficients are only stored in memory when the AEC is performing sufficiently well.

If the ERLE statistic exceeds the relevant threshold, indicating that the AEC is performing well, process 400 continues to block 404. At block 404, a measurement of microphone distortion is compared to a second threshold. Assuming that the level of distortion is below the second threshold, process 400 continues to block 406. At block 406, a comparison is conducted to determine whether a level of tonality in the loudspeaker (far-end) signal is below a third threshold. The distortion and tonality comparisons at blocks 404 and 406, like the ERLE comparison at block 402, are meant to ensure that coefficients are only stored when the AEC is performing well.

If any of the comparison criteria in blocks 402, 404, or 406 are not satisfied, indicating that the AEC is not performing well, process 400 will proceed to block 408. If this block is reached, coefficients will not be stored and a frame count will be incremented instead. This frame count keeps track of how many frames have been processed since the last time a set of coefficients were stored. If, on the other hand, all of the criteria in blocks 402, 404, and 406 are satisfied, process 400 continues to block 410 where the current AEC coefficients are stored in memory. The frame count is also reset to zero at this block.

Process 400 of FIG. 4A may be executed regularly, e.g., for each frame that is processed by an AEC, so that suitable coefficients are stored in memory whenever they become available. In contrast, process 450 of FIG. 4B is executed only when it becomes necessary to use these stored coefficients, e.g., when a reset operation is triggered at block 322 of FIG. 3. Process 450 begins at block 452 where the frame count described above is compared to a fourth threshold. This comparison ensures that stored coefficients will only be used in a reset operation if they are sufficiently recent to be relied upon. If the frame count is less than the fourth threshold at block 452, process 450 continues to block 454, where the current coefficients are reset to the values that were previously stored in memory. If the frame count is not less than the fourth threshold, indicating that the stored coefficients are too old to be relied upon, then process 450 continues to block 456 where the current coefficients are reset to zero.

The foregoing processes 300, 400, and 450 determine either an adaptation rate or a set of coefficients for an AEC to use in filtering a particular frame of the microphone signal m. If an adaptation rate is determined, the AEC may go on to adjust the transform coefficients in accordance with the determined rate. Once the coefficients are determined, either by adaptation or by a reset operation, the AEC may calculate the estimated echo, and subtract the estimated echo from the microphone signal m, yielding the filtered AEC output signal e.

TERMINOLOGY

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of controlling an acoustic echo canceller (AEC), the method comprising:
    receiving a far-end signal;
    receiving a microphone signal comprising an actual echo of the far-end signal;
    calculating an estimated echo based on the far-end signal and a set of adaptive coefficients;
    detecting divergence of the estimated echo from the actual echo in a first frame;
    resetting the adaptive coefficients to previously stored values, based at least in part on the detected divergence of the estimated echo from the actual echo in the first frame;
    detecting, in a second frame, signal condition information comprising at least one of echo path change, microphone signal inactivity, far-end signal inactivity, microphone signal distortion, double talk, or far-end signal tonality; and
    determining a rate of adaptation for the adaptive coefficients based on the signal condition information.

2. The method of claim 1, wherein resetting the adaptive coefficients to the previously stored values is further based at least in part on a first frame count associated with the previously stored values.

3. The method of claim 2, further comprising detecting divergence of the estimated echo from the actual echo in a third frame and, in response to detecting divergence in the third frame, resetting the adaptive coefficients to zero if a second frame count associated with the previously stored values is not less than a predefined threshold.

4. The method of claim 1, wherein the signal condition information comprises microphone signal distortion, and wherein determining the rate of adaptation comprises disabling adaptation.

5. The method of claim 4, wherein the distortion comprises clipping.

6. The method of claim 1, wherein the signal condition information comprises far-end signal tonality, and wherein determining the rate of adaptation comprises decreasing the rate of adaptation.

7. The method of claim 6, wherein decreasing the rate of adaptation comprises disabling adaptation.

8. One or more non-transitory computer-readable storage media comprising computer-executable instructions to:
    receive a far-end signal;
    receive a microphone signal comprising an actual echo of the far-end signal;
    calculate an estimated echo based on the far-end signal and a set of adaptive coefficients;
    detect divergence of the estimated echo from the actual echo; and
    reset the adaptive coefficients to previously stored values or to zero, in response to the detected divergence of the estimated echo from the actual echo.

9. The one or more non-transitory computer-readable storage media of claim 8, wherein the adaptive coefficients are reset to the previously stored values if the previously stored values are associated with a frame count that is less than a predefined threshold.

10. The one or more non-transitory computer-readable storage media of claim 8, wherein the adaptive coefficients are reset to zero if the previously stored values are associated with a frame count that is not less than the predefined threshold.

11. The one or more non-transitory computer-readable storage media of claim 8, further comprising computer-executable instructions to:
    detect whether distortion is present in the microphone signal; and
    disable adaptation of the adaptive coefficients if distortion is detected.

12. The one or more non-transitory computer-readable storage media of claim 11, wherein the distortion comprises clipping.

13. The one or more non-transitory computer-readable storage media of claim 8, further comprising computer-executable instructions to:
    detect whether strong tonality is present in the far-end signal, if distortion is not detected in the microphone signal; and
    decrease the rate of adaptation used to determine the adaptive coefficients, if strong tonality is detected in the far-end signal.

14. The one or more non-transitory computer-readable storage media of claim 13, wherein decreasing the rate of adaptation comprises disabling adaptation.

15. A device comprising:
    a memory storing computer-executable instructions; and
    a processor configured to execute the computer-executable instruction to cause the processor to:
        receive a far-end signal;
        receive a microphone signal comprising an actual echo of the far-end signal;
        calculate an estimated echo based on the far-end signal and a set of adaptive coefficients;
        detect divergence of the estimated echo from the actual echo; and
        reset the adaptive coefficients to previously stored values or to zero, in response to the detected divergence of the estimated echo from the actual echo.

16. The device of claim 15, wherein the processor is further configured to execute the computer-executable instructions to:
    determine that the previously stored values are associated with a frame count that is less than a predefined threshold; and
    reset the adaptive coefficients to the previously stored values.

17. The device of claim 15, wherein the processor is further configured to execute the computer-executable instructions to:
    determine that the previously stored values are associated with a frame count that is not less than a predefined threshold; and
    reset the adaptive coefficients to zero.

18. The device of claim 15, wherein the processor is further configured to execute the computer-executable instructions to:

detect whether distortion is present in the microphone signal; and disable adaptation of the adaptive coefficients if distortion is detected.

19. The device of claim 18, wherein the distortion comprises clipping.

20. The device of claim 15, wherein the processor is further configured to execute the computer-executable instructions to:

detect whether strong tonality is present in the far-end signal, if distortion is not detected in the microphone signal; and disable adaptation of the adaptive coefficients or decreasing the rate of adaptation, if strong tonality is detected in the far-end signal.

* * * * *